UNITED STATES PATENT OFFICE.

CHARLES L. IRESON, OF BOSTON, MASSACHUSETTS.

STEAM-PACKING.

SPECIFICATION forming part of Letters Patent No. 607,244, dated July 12, 1898.

Application filed April 4, 1898. Serial No. 676,327. (No specimens.)

*To all whom it may concern:*

Be it known that I, CHARLES L. IRESON, a citizen of the United States, residing at Boston, in the county of Suffolk and State of Massachusetts, have invented a new and useful Improvement in Steam-Packing, of which the following is a full, clear, and exact description.

The invention relates to that class of packing in which, because of the presence of rubber and sulfur, a vulcanizable action takes place when the same is subjected to heat.

This packing is used for packing all sorts of steam and other joints where heat is present. Such packings need to retain a life or a resiliency for as long a period as possible, and there is always a tendency because of the presence of the sulfur and for other reasons for the compounds to become dry and hard and thus lose their packing qualities. I have ascertained that it is possible to prolong this resilient state in the presence of high heat by substituting for the usual refractory matter employed in these compounds a refractory composition consisting of a mixture of fossil-flour and ultramarine-blue. These elements, when combined and mixed with a suitable rubber composition, produce the effect which I have above described. The rubber composition, barring the fossil-flour and ultramarine-blue, may have any of the usual constituents of this class of packing, which ordinarily comprises rubber, sulfur sufficient to slowly vulcanize or cure the rubber, and a filling of zinc-powder, paris-white, and litharge or similar ingredients. To this composition, which usually comprises about fifty per cent. of the compound, I add the ultramarine-blue and the fossil-flour to the extent of about fifty per cent. and in the proportion of about seven to ten per cent. of ultramarine-blue and from forty to forty-five per cent. of the fossil-flour.

I would not, however, be understood as limiting the proportions to the exact percentages which I have above described, as they may vary considerably and still the valuable results of my invention be obtained.

Having thus fully described my invention, I claim and desire to secure by Letters Patent of the United States—

The steam-packing compound herein described, consisting of a vulcanizable rubber composition, substantially as described, combined with fossil-flour and ultramarine-blue in about the proportions indicated, as and for the purposes set forth.

CHARLES L. IRESON.

Witnesses:
F. F. RAYMOND, 2d,
J. M. DOLAN.